US010846770B2

(12) United States Patent
Nathan et al.

(10) Patent No.: US 10,846,770 B2
(45) Date of Patent: Nov. 24, 2020

(54) PROCESS FOR ORDERING A SELECTION IN ADVANCE, DIGITAL SYSTEM AND JUKEBOX FOR EMBODIMENT OF THE PROCESS

(71) Applicant: TouchTunes Music Corporation, New York, NY (US)

(72) Inventors: Guy Nathan, Nun's Island (CA); Dominique Dion, Laval (CA); Tony Mastronardi, Pierrefonds (CA)

(73) Assignee: TouchTunes Music Corporation, New York, NY (US)

( * ) Notice: Subject to any disclaimer, the term of this patent is extended or adjusted under 35 U.S.C. 154(b) by 189 days.

(21) Appl. No.: 16/049,431

(22) Filed: Jul. 30, 2018

(65) Prior Publication Data

US 2018/0336622 A1 Nov. 22, 2018

Related U.S. Application Data

(60) Continuation of application No. 14/796,270, filed on Jul. 10, 2015, now Pat. No. 10,068,279, which is a (Continued)

(30) Foreign Application Priority Data

Feb. 3, 2000 (FR) ...................................... 00 02252

(51) Int. Cl.
*G06Q 30/06* (2012.01)
*H04L 29/08* (2006.01)
(Continued)

(52) U.S. Cl.
CPC ..... *G06Q 30/0613* (2013.01); *G06F 16/1824* (2019.01); *G06F 16/68* (2019.01);
(Continued)

(58) Field of Classification Search
CPC .......... G06Q 30/0633; G06Q 30/0613; G06Q 30/0641; G06Q 30/0601; G06Q 20/40;
(Continued)

(56) References Cited

U.S. PATENT DOCUMENTS

| 3,807,541 A | 4/1974 | Kortenhaus |
| 3,982,620 A | 9/1976 | Kotenhaus |

(Continued)

FOREIGN PATENT DOCUMENTS

| AU | 199954012 | 4/2000 |
| CN | 1340939 | 3/2002 |

(Continued)

OTHER PUBLICATIONS

"About Ecast" leaflet, 2 pages, at least as early as Nov. 8, 2013.
(Continued)

*Primary Examiner* — Yogesh C Garg
(74) *Attorney, Agent, or Firm* — Nixon & Vanderhye, P.C.

(57) ABSTRACT

This invention relates to a process for ordering a selection in advance, characterized in that it includes a step in which a menu is displayed followed by a selection in this menu, to make specific requests and particularly: a step displaying the event for which the advance order of a selection is made, and then selection of the event; a step displaying the identity of destination equipment on which the selection is to be played, and then selection of this equipment; a step displaying the date and time at which the selection is to be made on the destination equipment; a step in which particular requests are recorded and downloaded onto a file only after payment has been verified.

19 Claims, 4 Drawing Sheets

Related U.S. Application Data continuation of application No. 13/594,009, filed on Aug. 24, 2012, now Pat. No. 9,129,328, which is a continuation of application No. 12/801,744, filed on Jun. 23, 2010, now Pat. No. 8,275,668, which is a division of application No. 11/267,303, filed on Nov. 7, 2005, now Pat. No. 7,778,879, which is a continuation of application No. 09/585,325, filed on Jun. 2, 2000, now abandoned.

(51) Int. Cl.
| | | |
|---|---|---|
| *G06Q 20/40* | (2012.01) | |
| *G06F 16/68* | (2019.01) | |
| *G06F 16/955* | (2019.01) | |
| *G06F 16/182* | (2019.01) | |
| *G07F 17/16* | (2006.01) | |
| *G07F 17/30* | (2006.01) | |
| *G11B 19/08* | (2006.01) | |

(52) U.S. Cl.
CPC ........... *G06F 16/955* (2019.01); *G06Q 20/40* (2013.01); *G06Q 30/0601* (2013.01); *G06Q 30/0633* (2013.01); *G06Q 30/0641* (2013.01); *G07F 17/16* (2013.01); *G07F 17/305* (2013.01); *G11B 19/08* (2013.01); *H04L 67/125* (2013.01)

(58) Field of Classification Search
CPC .... G06F 16/68; G06F 16/955; G06F 16/1824; G07F 17/16; G07F 17/305; G11B 19/08
USPC .......................... 705/26.8, 26.41, 27.1, 26.1
See application file for complete search history.

(56) References Cited

U.S. PATENT DOCUMENTS

| | | |
|---|---|---|
| 4,008,369 A | 2/1977 | Theurer et al. |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,336,935 A | 6/1982 | Goldfarb |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt et al. |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A | 8/1988 | Korn et al. |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,965,675 A | 10/1990 | Masashi et al. |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimara |
| 5,077,607 A | 12/1991 | Johnson et al. |
| 5,081,534 A | 1/1992 | Geiger et al. |
| 5,099,319 A * | 3/1992 | Esch ............... G09B 5/065 348/722 |
| 5,101,451 A | 3/1992 | Ash et al. |
| 5,101,499 A | 3/1992 | Streck et al. |
| 5,106,097 A | 4/1992 | Levine |
| 5,117,407 A | 5/1992 | Vogel |
| 5,128,862 A | 7/1992 | Mueller |
| 5,138,712 A | 8/1992 | Corbin |
| 5,148,159 A | 9/1992 | Clark et al. |
| 5,155,847 A | 10/1992 | Kirouac |
| 5,159,678 A | 10/1992 | Wengelski et al. |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,231,157 A | 7/1993 | Herzig et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,335,313 A | 8/1994 | Douglas |
| 5,339,095 A | 8/1994 | Redford |
| 5,339,413 A | 8/1994 | Koval |
| 5,341,350 A | 8/1994 | Frank |

(56) References Cited

U.S. PATENT DOCUMENTS

| | | |
|---|---|---|
| 5,355,302 A | 10/1994 | Martin et al. |
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,389,950 A | 2/1995 | Martin et al. |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,465,329 A | 11/1995 | Whisler |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,473,746 A | 12/1995 | Pritt et al. |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,532,991 A | 7/1996 | Sasaki |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,515 A | 9/1996 | Abbruzzese et al. |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,559,714 A | 9/1996 | Banks et al. |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,607,099 A | 3/1997 | Yeh et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay et al. |
| 5,643,831 A | 7/1997 | Ochiai et al. |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankovitz |
| 5,708,811 A | 1/1998 | Arendt |
| 5,712,976 A | 1/1998 | Falcon et al. |
| 5,713,024 A | 1/1998 | Halladay |
| 5,715,416 A | 2/1998 | Baker |
| 5,717,452 A | 2/1998 | Janie et al. |
| 5,721,583 A | 2/1998 | Harada et al. |
| 5,721,815 A | 2/1998 | Ottesen et al. |
| 5,721,827 A | 2/1998 | Logan et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos et al. |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,748,954 A | 5/1998 | Mauldin |
| 5,751,336 A | 5/1998 | Aggarwal et al. |
| 5,752,232 A | 5/1998 | Basore et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choqiuer |
| 5,774,672 A | 6/1998 | Funahashi |
| 5,778,395 A | 7/1998 | Whiting |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,790,935 A | 8/1998 | Payton |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,558 A | 9/1998 | Pierce |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |

(56) References Cited

U.S. PATENT DOCUMENTS

| | | |
|---|---|---|
| 5,825,884 A | 10/1998 | Zdepski et al. |
| 5,828,343 A | 10/1998 | MacDonald et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,139 A | 3/1999 | Madison, Jr. et al. |
| 5,887,193 A | 3/1999 | Takahashi |
| 5,893,162 A | 4/1999 | Lau et al. |
| 5,895,455 A | 4/1999 | Bellinger et al. |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Johnson |
| 5,923,885 A | 7/1999 | Johnson |
| 5,926,531 A | 7/1999 | Petite |
| 5,926,624 A | 7/1999 | Katz et al. |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,960,167 A | 9/1999 | Roberts et al. |
| 5,963,916 A | 10/1999 | Kaplan |
| 5,966,495 A | 10/1999 | Takahashi |
| 5,970,467 A | 10/1999 | Alavi |
| 5,978,855 A | 11/1999 | Metz et al. |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,021,386 A | 2/2000 | Davis |
| 6,023,705 A | 2/2000 | Bellinger et al. |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,049,891 A | 4/2000 | Inamoto |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 | 2/2001 | Adams et al. |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,175 B1 | 4/2001 | Sliger et al. |
| 6,216,227 B1 | 4/2001 | Goldstein et al. |
| 6,219,692 B1 | 4/2001 | Stiles |
| 6,223,209 B1 | 4/2001 | Watson |
| 6,226,412 B1 | 5/2001 | Schwab |
| 6,226,715 B1 | 5/2001 | Van Der Wolf et al. |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,282,709 B1 | 8/2001 | Reha et al. |
| 6,288,688 B1 | 9/2001 | Hughes et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,301,710 B1 | 10/2001 | Fujiwara |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Glaser |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,353,820 B1 | 3/2002 | Edwards et al. |
| 6,356,971 B1 | 3/2002 | Katz et al. |
| 6,359,616 B1 | 3/2002 | Ogura et al. |
| 6,359,661 B1 | 3/2002 | Nickum |
| 6,360,172 B1 * | 3/2002 | Burfeind .............. G06Q 30/02 455/414.4 |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |

(56) References Cited

U.S. PATENT DOCUMENTS

| | | |
|---|---|---|
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,080 B1 | 9/2002 | Van Ryzin et al. |
| 6,446,130 B1 | 9/2002 | Grapes |
| 6,449,688 B1 | 9/2002 | Peters et al. |
| 6,470,496 B1 | 10/2002 | Kato et al. |
| 6,473,794 B1 | 10/2002 | Guheen et al. |
| 6,488,508 B2 | 12/2002 | Okamoto |
| 6,490,570 B1 | 12/2002 | Numaoka |
| 6,493,871 B1 | 12/2002 | McGuire et al. |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| D475,029 S | 5/2003 | Nathan et al. |
| 6,560,651 B2 | 5/2003 | Katz et al. |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,724,974 B2 | 4/2004 | Naruto et al. |
| 6,728,824 B1 | 4/2004 | Chen |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,762,585 B2 | 7/2004 | Liao |
| 6,789,215 B1 | 9/2004 | Rupp et al. |
| 6,816,578 B1 | 11/2004 | Kredo et al. |
| 6,850,252 B1 | 2/2005 | Hoffberg |
| 6,898,161 B1 | 5/2005 | Nathan |
| 6,904,592 B1 | 6/2005 | Johnson |
| 6,920,614 B1 | 7/2005 | Schindler et al. |
| 6,928,653 B1 | 8/2005 | Ellis et al. |
| 6,934,700 B1 | 8/2005 | Ijdens et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,073,172 B2 | 7/2006 | Chamberlain |
| 7,103,583 B1 | 9/2006 | Baum et al. |
| 7,107,109 B1 | 9/2006 | Nathan et al. |
| 7,111,129 B2 | 9/2006 | Percival |
| 7,114,013 B2 | 9/2006 | Bakke et al. |
| 7,124,194 B2 | 10/2006 | Nathan et al. |
| 7,181,458 B1 | 2/2007 | Higashi |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,205,471 B2 | 4/2007 | Looney et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,281,652 B2 | 10/2007 | Foss |
| 7,293,277 B1 | 11/2007 | Nathan |
| 7,356,831 B2 | 4/2008 | Nathan |
| 7,406,529 B2 | 7/2008 | Reed |
| 7,415,707 B2 | 8/2008 | Taguchi et al. |
| 7,418,474 B2 | 8/2008 | Schwab |
| 7,424,731 B1 | 9/2008 | Nathan et al. |
| 7,430,736 B2 | 9/2008 | Nguyen et al. |
| 7,433,832 B1 | 10/2008 | Bezos et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,533,182 B2 | 5/2009 | Wurtzel et al. |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,657,910 B1 | 2/2010 | McAulay et al. |
| D616,414 S | 5/2010 | Nathan et al. |
| 7,749,083 B2 | 7/2010 | Nathan et al. |
| 7,757,264 B2 | 7/2010 | Nathan |
| 7,761,538 B2 | 7/2010 | Lin et al. |
| 7,770,165 B2 | 8/2010 | Olson et al. |
| 7,778,879 B2 | 8/2010 | Nathan et al. |
| 7,783,593 B2 | 8/2010 | Espino |
| 7,783,774 B2 | 8/2010 | Nathan et al. |
| 7,793,331 B2 | 9/2010 | Nathan et al. |
| 7,819,734 B2 | 10/2010 | Nathan et al. |
| 7,822,687 B2 | 10/2010 | Brillon et al. |
| D629,382 S | 12/2010 | Nathan et al. |
| D642,553 S | 8/2011 | Nathan et al. |
| 7,996,873 B1 | 8/2011 | Nathan et al. |
| 8,015,200 B2 | 9/2011 | Seiflein et al. |
| 8,028,318 B2 | 9/2011 | Nathan |
| 8,032,879 B2 | 10/2011 | Nathan et al. |
| 8,037,412 B2 | 10/2011 | Nathan et al. |
| 8,052,512 B2 | 11/2011 | Nathan et al. |
| 8,103,589 B2 | 1/2012 | Nathan et al. |
| 8,151,304 B2 | 4/2012 | Nathan et al. |
| D665,375 S | 8/2012 | Garneau et al. |
| 8,292,712 B2 | 10/2012 | Nathan et al. |
| 8,332,895 B2 | 12/2012 | Nathan et al. |
| 8,429,530 B2 | 4/2013 | Neuman et al. |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0030912 A1 | 10/2001 | Kalis et al. |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0123331 A1 | 9/2002 | Lehaff et al. |
| 2002/0126141 A1 | 9/2002 | Mastronardi |
| 2002/0129036 A1 | 9/2002 | Ho Yuen Lok et al. |
| 2002/0162104 A1 | 10/2002 | Raike et al. |
| 2003/0004833 A1 | 1/2003 | Pollak et al. |
| 2003/0005099 A1 | 1/2003 | Sven et al. |
| 2003/0006911 A1 | 1/2003 | Smith et al. |
| 2003/0008703 A1 | 1/2003 | Gauselmann |
| 2003/0018740 A1 | 1/2003 | Sonoda et al. |
| 2003/0027120 A1 | 2/2003 | Jean |
| 2003/0031096 A1 | 2/2003 | Nathan et al. |
| 2003/0041093 A1 | 2/2003 | Yamane et al. |
| 2003/0065639 A1 | 4/2003 | Fiennes et al. |
| 2003/0076380 A1 | 4/2003 | Yusef et al. |
| 2003/0088538 A1 | 5/2003 | Ballard |
| 2003/0093790 A1 | 5/2003 | Logan et al. |
| 2003/0101450 A1 | 5/2003 | Davidsson et al. |
| 2003/0104865 A1 | 6/2003 | Itkis et al. |
| 2003/0108164 A1 | 6/2003 | Laurin et al. |
| 2003/0135424 A1 | 7/2003 | Davis et al. |
| 2003/0144910 A1 | 7/2003 | Flaherty et al. |
| 2003/0176218 A1 | 9/2003 | LeMay et al. |
| 2003/0191753 A1 | 10/2003 | Hoch |
| 2003/0208586 A1 | 11/2003 | Mastronardi et al. |
| 2003/0225834 A1 | 12/2003 | Lee et al. |

(56) References Cited

U.S. PATENT DOCUMENTS

| | | |
|---|---|---|
| 2004/0010800 A1 | 1/2004 | Goci |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0145477 A1 | 7/2004 | Easter |
| 2004/0158555 A1 | 8/2004 | Seedman et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2005/0048816 A1 | 3/2005 | Higgins |
| 2005/0060405 A1 | 3/2005 | Nathan et al. |
| 2005/0073782 A1 | 4/2005 | Nathan |
| 2005/0086172 A1 | 4/2005 | Stefik |
| 2005/0111671 A1 | 5/2005 | Nathan |
| 2005/0125833 A1 | 6/2005 | Nathan et al. |
| 2005/0201254 A1 | 9/2005 | Looney et al. |
| 2005/0267819 A1 | 12/2005 | Kaplan |
| 2006/0018208 A1 | 1/2006 | Nathan et al. |
| 2006/0031896 A1 | 2/2006 | Pulitzer |
| 2006/0035707 A1 | 2/2006 | Nguyen et al. |
| 2006/0062094 A1 | 3/2006 | Nathan et al. |
| 2006/0143575 A1 | 6/2006 | Sauermann |
| 2006/0227673 A1 | 10/2006 | Yamashita et al. |
| 2006/0239131 A1 | 10/2006 | Nathan et al. |
| 2006/0293773 A1 | 12/2006 | Nathan et al. |
| 2007/0025701 A1 | 2/2007 | Kawasaki et al. |
| 2007/0086280 A1 | 4/2007 | Cappello et al. |
| 2007/0121430 A1 | 5/2007 | Nathan |
| 2007/0139410 A1 | 6/2007 | Abe et al. |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0220052 A1 | 9/2007 | Kudo et al. |
| 2007/0247979 A1 | 10/2007 | Brillon et al. |
| 2008/0065925 A1 | 3/2008 | Oliverio et al. |
| 2008/0066016 A1 | 3/2008 | Dowdy et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0155588 A1 | 6/2008 | Roberts et al. |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0198271 A1 | 8/2008 | Maki |
| 2008/0222199 A1 | 9/2008 | Tiu et al. |
| 2008/0239887 A1 | 10/2008 | Tooker et al. |
| 2008/0305738 A1 | 12/2008 | Khedouri et al. |
| 2009/0030802 A1 | 1/2009 | Plotnick et al. |
| 2009/0037969 A1 | 2/2009 | Nathan et al. |
| 2009/0042632 A1 | 2/2009 | Guenster et al. |
| 2009/0063976 A1 | 3/2009 | Bull et al. |
| 2009/0070341 A1 | 3/2009 | Mastronardi et al. |
| 2009/0091087 A1 | 4/2009 | Wasmund |
| 2009/0100092 A1 | 4/2009 | Seiflein et al. |
| 2009/0138111 A1 | 5/2009 | Mastronardi |
| 2009/0172565 A1 | 7/2009 | Jackson et al. |
| 2009/0177301 A1 | 7/2009 | Hayes |
| 2009/0241061 A1 | 9/2009 | Asai et al. |
| 2009/0265734 A1 | 10/2009 | Dion et al. |
| 2009/0282491 A1 | 11/2009 | Nathan |
| 2009/0287696 A1 | 11/2009 | Galuten |
| 2009/0307314 A1 | 12/2009 | Smith et al. |
| 2010/0042505 A1 | 2/2010 | Straus |
| 2010/0211818 A1 | 8/2010 | Nathan et al. |
| 2010/0241259 A1 | 9/2010 | Nathan |
| 2010/0247081 A1 | 9/2010 | Pons |
| 2010/0269066 A1 | 10/2010 | Nathan |
| 2010/0299232 A1 | 11/2010 | Nathan et al. |
| 2011/0066943 A1 | 3/2011 | Brillon et al. |
| 2011/0283236 A1 | 11/2011 | Beaumier et al. |
| 2011/0321026 A1 | 12/2011 | Nathan et al. |
| 2012/0009985 A1 | 1/2012 | Nathan et al. |
| 2012/0053713 A1 | 3/2012 | Nathan |
| 2012/0105464 A1 | 5/2012 | Franceus |
| 2012/0143732 A1 | 6/2012 | Nathan et al. |
| 2012/0150614 A1 | 6/2012 | Dion et al. |
| 2012/0158531 A1 | 6/2012 | Dion et al. |
| 2012/0166965 A1 | 6/2012 | Nathan et al. |
| 2012/0240140 A1 | 9/2012 | Nathan |
| 2013/0021281 A1 | 1/2013 | Tse et al. |
| 2013/0040715 A1 | 2/2013 | Nathan et al. |
| 2013/0044995 A1 | 2/2013 | Cappello et al. |
| 2013/0070093 A1 | 3/2013 | Rivera et al. |
| 2013/0091054 A1 | 4/2013 | Nathan et al. |
| 2014/0026154 A1 | 1/2014 | Nathan |

FOREIGN PATENT DOCUMENTS

| | | |
|---|---|---|
| DE | 3406058 | 8/1985 |
| DE | 3723737 | 1/1988 |
| DE | 3820835 | 1/1989 |
| DE | 3815071 | 11/1989 |
| DE | 4244198 | 6/1994 |
| DE | 19539172 | 9/1996 |
| DE | 19610739 | 9/1997 |
| DE | 19904007 | 8/2000 |
| EP | 0082077 | 6/1983 |
| EP | 0140593 | 5/1985 |
| EP | 0256921 | 2/1988 |
| EP | 0283304 | 9/1988 |
| EP | 0283350 | 9/1988 |
| EP | 0309298 | 3/1989 |
| EP | 0313359 | 4/1989 |
| EP | 0340787 | 11/1989 |
| EP | 0363186 | 4/1990 |
| EP | 0425168 | 5/1991 |
| EP | 0464562 | 1/1992 |
| EP | 0480558 | 4/1992 |
| EP | 0498130 | 8/1992 |
| EP | 0507110 | 10/1992 |
| EP | 0529834 | 3/1993 |
| EP | 0538319 | 4/1993 |
| EP | 0631283 | 12/1994 |
| EP | 0632371 | 1/1995 |
| EP | 0711076 | 5/1996 |
| EP | 0786122 | 7/1997 |
| EP | 0817103 | 1/1998 |
| EP | 0841616 | 5/1998 |
| EP | 0919964 | 6/1999 |
| EP | 0959570 | 11/1999 |
| EP | 0974896 | 1/2000 |
| EP | 0974941 | 1/2000 |
| EP | 0982695 | 3/2000 |
| EP | 1001391 | 5/2000 |
| EP | 1170951 | 1/2002 |
| EP | 1288802 | 3/2003 |
| EP | 1408427 | 4/2004 |
| EP | 1549919 | 4/2004 |
| EP | 1962251 | 8/2008 |
| FR | 2602352 | 2/1988 |
| FR | 2808906 | 11/2001 |
| GB | 2122799 | 1/1984 |
| GB | 2166328 | 4/1986 |
| GB | 2170943 | 8/1986 |
| GB | 2193420 | 2/1988 |
| GB | 2238680 | 6/1991 |
| GB | 2254469 | 10/1992 |
| GB | 2259398 | 3/1993 |
| GB | 2262170 | 6/1993 |
| GB | 2380377 | 4/2003 |
| GB | 2505584 | 8/2014 |
| JP | 57173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |

(56) References Cited

FOREIGN PATENT DOCUMENTS

| | | |
|---|---|---|
| JP | 07281682 | 10/1995 |
| JP | 07-311587 | 11/1995 |
| JP | 8274812 | 10/1996 |
| JP | 08279235 | 10/1996 |
| JP | 08289976 | 11/1996 |
| JP | 928918 | 2/1997 |
| JP | 9114470 | 5/1997 |
| JP | 9127964 | 5/1997 |
| JP | 09-244900 | 9/1997 |
| JP | 10-098344 | 4/1998 |
| JP | 10-222537 | 8/1998 |
| JP | 11-003088 | 1/1999 |
| JP | 11-024686 | 1/1999 |
| JP | 11-095768 | 4/1999 |
| JP | 2002-83640 | 3/2002 |
| JP | 2002-537584 | 11/2002 |
| JP | 2003-076380 | 3/2003 |
| JP | 2003-084903 | 3/2003 |
| JP | 2003-099072 | 4/2003 |
| JP | 2005-107267 | 4/2005 |
| JP | 2005-184237 | 7/2005 |
| JP | 2006-048076 | 2/2006 |
| JP | 2007-034253 | 2/2007 |
| JP | 2007-041722 | 2/2007 |
| JP | 2007/505410 | 3/2007 |
| JP | 07504517 | 3/2007 |
| JP | 2007-102982 | 4/2007 |
| JP | 2007-104072 | 4/2007 |
| JP | 2007-128609 | 5/2007 |
| JP | 2007-164078 | 6/2007 |
| JP | 2007-164298 | 6/2007 |
| JP | 2007/179333 | 7/2007 |
| JP | 2007-241748 | 9/2007 |
| JP | 2008-058656 | 3/2008 |
| JP | 2009-017529 | 1/2009 |
| JP | 2009-075540 | 4/2009 |
| WO | WO 86/01326 | 2/1986 |
| WO | WO 90/00429 | 1/1990 |
| WO | WO 90/07843 | 7/1990 |
| WO | WO 91/08542 | 6/1991 |
| WO | WO 91/20082 | 12/1991 |
| WO | WO 93/16557 | 8/1993 |
| WO | WO 93/18465 | 9/1993 |
| WO | WO93/021732 | 10/1993 |
| WO | WO 94/03894 | 2/1994 |
| WO | WO 4/14273 | 6/1994 |
| WO | WO 94/15306 | 7/1994 |
| WO | WO 94/15416 | 7/1994 |
| WO | WO 95/03609 | 2/1995 |
| WO | WO 95/29537 | 11/1995 |
| WO | WO 6/12258 | 4/1996 |
| WO | WO 96/12255 | 4/1996 |
| WO | WO 96/12256 | 4/1996 |
| WO | WO 96/12257 | 4/1996 |
| WO | WO 98/07940 | 2/1998 |
| WO | WO 98/11487 | 3/1998 |
| WO | WO 98/45835 | 10/1998 |
| WO | WO 99/35753 | 7/1999 |
| WO | WO 01/00290 | 1/2001 |
| WO | WO 01/08148 | 2/2001 |
| WO | WO 01/71608 | 9/2001 |
| WO | WO 02/060546 | 8/2002 |
| WO | WO 02/095752 | 11/2002 |
| WO | WO 01/084353 | 1/2003 |
| WO | WO 03/069613 | 8/2003 |
| WO | WO 2004/029775 | 4/2004 |
| WO | 2005/026916 | 3/2005 |
| WO | WO 2006/014739 | 2/2006 |
| WO | WO 2006/056933 | 6/2006 |
| WO | WO 2007/092542 | 8/2007 |
| WO | WO 2008-033853 | 3/2008 |
| WO | WO 2011094330 | 8/2011 |
| WO | WO 2013/040603 | 3/2013 |

OTHER PUBLICATIONS

Ahanger et al.; A Digital On-Demand Video Service Supporting Content-Based Queries; 1993; 9 pages.
Austin Cyber Limits: Name That Tune [offline], [retrieved Jul. 23, 2001]. Retrieved from the Internet: <http://www.pbs.ork/klru/austin/games/namethattune.html>.
Back to the Tunes [online], [retrieved Jul. 23, 2001], Retrieved from the Internet: <http://citc5.hispeed.com/rules.html>.
Bonczek et al, "The DSS Development System", 1983 National Computer Conference, Anaheim, California, May 16-19, 1983, pp. 441-455.
Chan et al., "Distributed servers architectures for networked video services", IEEE Trans on Networking, vol. 9, No. 2, pp. 125-136, 2001.
Chen et al., "Optimization of the grouped sweeping scheduling (GSS) with heterogeneous multimedia streams", ACM Multimedia, pp. 1-7, 1993.
Crutcher et al., "The networked video Jukebox", IEEE, Trans. on circuits and systems for video technology, vol. 4, No. 2, pp. 105-120, 1994.
"Darts Revolution Again", Replay Magazine, Mar. 1991, pp. 146-148.
Decision of the European Patent Office to revoke the related EP Patent No. 786 125, dated Feb. 17, 2005.
Derfler et al., "How Networks Work", Millennium Ed., Que Corporation, Jan. 2000.
Drews, C.; Pestoni, F.; "Virtual jukebox: reviving a classic," Proceedings of the 35th Annual Hawaii International Conference System Sciences, pp. 887-893, Jan. 7-10, 2002.
"Ecast Forges Landmark International Technology Partnership", Business Wire at www.findarticles.com/cf_0/m0EIN/2000_July_25/63663604/print.html, 2 pages, Jul. 25, 2000.
"Ecast Selects Viant to Build Siren Entertainment System (™)", ScreamingMedia, PR Newswire San Francisco, industry.java,sum.com/javanews/stories/story2/0,1072,17618,00.html, 3 pages, Aug. 3, 1999.
European Search Report issued in EP 1 993 079, dated Jan. 15, 2009.
European Search Report issued for European Application No. 08000845.1-1238/1962251, dated Apr. 3, 2009.
Fachbuch, "Unterhaltungselektronic von A-Z" gfu 1, VDE-Verlag GmbH, pp. 12-13, 1983-1984.
"Foobar 2000 Evaluation Updated," MonkeyBiz, Aug. 3, 2008, 4 pages (with partial English translation). http://monkeybizinfo.blogspot.jp/2008/08/foobar2000.html.
Gallardo et al., "Tangible Jukebox: back to palpable music", ACM TEI, pp. 199-202, 2010.
Gralla, "How the Internet Works", Millennium Ed., Que Corporation, Aug. 1999.
Galen A. Grimes, Chapter 18, "Taking Advantage of Web-based Audio" [online] [retrieved Mar. 24, 2000].
Hewlett-Packard Development Co; HP Open View Storage Data Protector Admin's Guideline Manual Edition; May 2003; Copyright 2003, 60 pages http://h20000.www2.hp.com/bc/docs/support/SupportManual/c006637931/c00663793.pdf.
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 33, No. 12, May 1991, "High-speed Opens and Shorts Substrate Tester", pp. 251-259.
IBM Technical Disclosure Bulletin, vol. 41, No. 1, Jan. 1998, "Safe Mechanism for Installing Operating System Updates with Applications," pp. 557-559.
ITouch 8 Plus brochure, JVL Corporation, 2005, 2 pages.
ITouch 27 New Games brochure, JVL Corporation, 2005, 2 pages.

(56) References Cited

OTHER PUBLICATIONS

Johnny Rockets Name That Tune [online], [retrieved Mar. 7, 2002]. Retrieved from the Internet: <http://www.johnnyrockets.com/docs/funstuff.html>.
Petril Koskelainem, "Report on Streamworks™," [online] [retrieved Mar. 24, 2000].
Kozierok, The PC Guide, Site Version 2.2.0, http://www.pcguide.com, Apr. 17, 2001.
Kraiss et al., "Integrated document caching and prefetching in storage hierarchies based on Markov chain predictions", The VLDB Journal, vol. 7, issue 3, pp. 141-162, 1998.
Liang et al., "Dynamic class loading in the Java virtual machine", ACM OOPSLA, pp. 36-44, 1998.
Look and iTouch brochure, JVL Corporation, 2004, 2 pages.
Ludescher et al., "File Storage Management for TFTF physics data", IEEE, pp. 856-859, 1992.
Megatouch Champ brochure, Merit Industries, Inc., 2005, 2 pages.
Melnik et al., "A mediation infrastructure for digital library services", ACM DL, pp. 123-132, 2000.
Definition of "Dynamically," Merriam Webster's Collegiate Dictionary, Tenth Edition, Merriam-Webster, Inc., Copyright 1999, pp. 361.
Mickey B's Jukebox Revue—Name That Tune! [online], [retrieved Jul. 23, 2001]. Retrieved from the Internet: <http://mickeyb.com/tune/>.
Mod Box Internet brochure, Merit Entertainment, 2006, 2 pages.
Newsome et al., "Proxy compilation of dynamically loaded java classes with MoJo", ACM LCTES, pp. 204-212, Jun. 2002.
Outlaw, Computer Technology Review, "Virtual Servers Offer Performance Benefits for Network Imaging", 1993.
Patent Abstract of Japan vol. 95, No. 010 & JP 07 281682 A (Naguo Yuasa), 27 October 1 JP 07 281682, figure 1-6 abrége.
Peter Pawlowski, "Basic Player Whose Appearance and Functions can be Customized Freely 'Foobar 2000' v1.0 is Unveiled,"Windows Forest, Japan, Jan. 12, 2010, 3 pages (with partial English translation). http://forest.impress.co.jp/docs/news/20100112 341870.html.
Pohlmann, "Principles of Digital Audio", Third Edition, 1995.
PR Newswire, Press Release, "MusicMatch Announces Commerical Availability of Meta Trust Certified MusicMatch jukebox", New York; Nov. 15, 1999, extracted from Internet, http://proquest.umi.com on Sep. 17, 2002.
Rollins et al., "Pixie: A jukebox architecture to support efficient peer content exchange", ACM Multimedia, pp. 179-188, 2002.
Schneier, "Applied Cryptography", Second Edition, John Wiley & Sons, Inc, New York, 1996.
Sprague et al., "Music selection using the partyvote democratic Jukebox", ACM AVI, pp. 433-436, 2008.
W. Richard Stevens, "TCP/IP Illustrated: vol. 1, the Protocols," Copyright 1994.
Stewart, "Ecast Deploys Marimba's Castanet to Power an Internet-Based, Entertainment Management System for the Out-of-Home Market", Marimba, Press Release, 3 pages, www.marimba.com/news/releases/ecast.dec13.html, Dec. 13, 1999.
Strauss et al., "Information Jukebox a semi public device for presenting multimedia information content", Pers. Ubiquit Comput, 7, pp. 217-220, 2003.
Summary of the oral proceedings regarding EP 786 125 before the Opposition Division of the European Patent Office, Feb. 17, 2005.
Tom & Liz's Name That Tune [online], [retrieved Jul. 23, 2001]. Retrieved from the Internet: <http://home.att.net/~tomnliz/Music.html>.
U.S. Appl. No. 29/371,355, Garneau et al., filed Dec. 14, 2010.
U.S. Appl. No. 61/536,015, filed Sep. 18, 2011; Rivera et al.
U.S. Appl. No. 29/401,854, filed Sep. 16, 2011; Garneau et al.
U.S. Appl. No. 61/129,637, Dion, filed Jul. 9, 2008.
U.S. Appl. No. 61/202,617, Dion, filed Mar. 18, 2009.
U.S. Appl. No. 61/584,750, filed Jan. 9, 2012; Rivera et al.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 1999 (Sep. 22, 1999).
Yuki Murata, iTunes no 'Kankyo Settei' Catalog & Tips 10 Sen, Mac People, ASCII Corporation, Oct. 1, 2007.
Written Opinion issued in PCT/US1122598, dated Mar. 29, 2011.

\* cited by examiner

PROCESS FOR ORDERING A SELECTION IN ADVANCE, DIGITAL SYSTEM AND JUKEBOX FOR EMBODIMENT OF THE PROCESS

CROSS-REFERENCES TO RELATED APPLICATIONS

This application is a continuation of application of Ser. No. 14/796,270 filed Jul. 10, 2015, which is a continuation of application Ser. No. 13/594,009 filed Aug. 24, 2012 now U.S. Pat. No. 9,129,328 issued Sep. 8, 2015, which is a continuation of application Ser. No. 12/801,744 filed Jun. 23, 2010, now U.S. Pat. No. 8,275,668 issued Sep. 5, 2015, which is a divisional of application Ser. No. 11/267,303 filed Nov. 7, 2005, now U.S. Pat. No. 7,778,879 issued Aug. 17, 2010, which is a divisional of application Ser. No. 09/585,325 filed Jun. 2, 2000 now abandoned, which claims priority to French Patent Application No. 00 02252 filed Feb. 23, 2000, the entire contents of which are hereby incorporated by reference in this application.

FIELD OF THE INVENTION

This invention relates to a process for ordering a selection in advance, and the digital system and jukebox for embodiment of the process.

BACKGROUND OF THE INVENTION

French patent application 98 09358 deposited on 22 Jul. 1998 describes a specific function of a jukebox and a network connecting a set of jukeboxes to a server in order to distribute the title song of a new album of a singer on a given date defined as the distribution and marketing date of the song, onto all reproduction systems. However, with this type of system, a particular jukebox user or a user connected to the host server through the Internet supervising a number of jukeboxes is unable to select a song and order it so that the song can be played on a given date on a given jukebox or on several given jukeboxes.

BRIEF SUMMARY OF THE INVENTION

The first purpose of this invention is to overcome this disadvantage of prior art by proposing a process for ordering a selection in advance.

This purpose is achieved by a process for ordering a selection in advance, characterized in that it includes a step in which a menu is displayed followed by a selection in this menu, to make specific requests and particularly:

a step displaying the event for which the advance order of a selection is made, and then selection of the event;

a step displaying the identity of destination equipment on which the selection is to be made, and then selection of this equipment;

a step displaying the date and time at which the selection shall be made on the destination equipment;

a step in which particular requests are recorded and downloaded onto a file only after payment has been verified.

Another purpose is to propose a digital jukebox capable of embodying the process for advance order of a selection.

This purpose is achieved using a device for an advance order of a selection characterized in that the jukebox d or the server d comprise means of displaying information on a screen close to the user to guide him in making specific requests;

means of saving these requests in a specific file;

means of periodically examining the file saved on the equipment to trigger execution of the request at the given date and time, or to trigger its downloading.

Finally, the last purpose is to propose a digital system forming a remote distribution network for audiovisual data for embodiment of the process.

This purpose is achieved by a digital system forming a remote distribution network, characterized in that the remote distribution network comprises a host server connected firstly to the Internet network, and secondly to a set of jukeboxes through a second network, each jukebox being identified by an identity number or an address that can be used to load each specific request on the destination jukebox and means of scanning the file containing specific requests on each jukebox to have them executed when the local time and the day correspond to the selected time and day.

BRIEF DESCRIPTION OF THE DRAWINGS

Other Features and Advantages of this Invention Will Become Clearer after Reading the Following Description with Reference to the Attached Drawings in which.

DETAILED DESCRIPTION OF THE INVENTION

Figure 1:
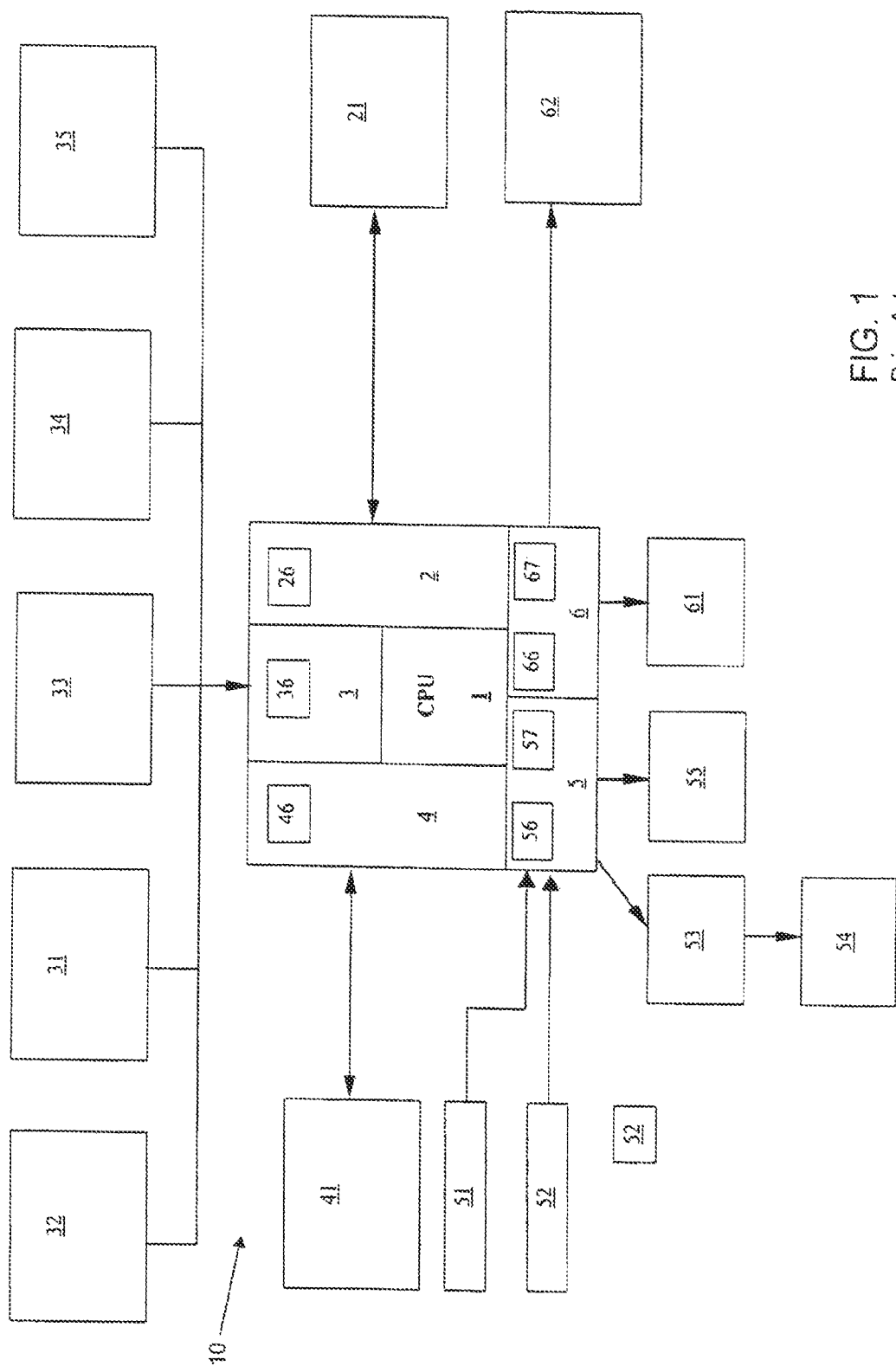
FIG. 1 represents a diagrammatic view of the electrical scheme of the equipment forming the invention.

Preferably, but non-restrictively, the audiovisual reproduction system (jukebox) 10 uses the equipment elements listed and referenced below.

The system unit 1 with a microprocessor is a high performance PC compatible system, the choice at the time of implementation was made for a Pentium type system with memory means and for example the following characteristics:

compatibility with the Vesa local bus,
processor cache memory: 256 kbytes minimum,
RAM memory: 32 Mbytes,
high performance serial ports,
microprocessor controlled SVGA type graphic adapter,
SCSI/2 type bus controller,
self-powered static RAM memory.

Any other system unit with equivalent or better performances could be used in the invention.

This system unit controls and manages a sound control circuit 5, a telecommunications control circuit 4, an input control circuit 3, a mass memory control circuit 2, and a display means control circuit 6. The display means are composed primarily of a SVGA type flat screen, high resolution, low radiation video monitor 62 with no interlacing. This is the monitor that will be used for image reproduction (for example album covers for musical selections), and to display graphics and video clips.

The mass memory means 21, for example using high speed high capacity SCSI type hard disks, are associated with the memory means already installed in the microprocessor controlled device. These means are used for the storage of digitized, compressed and possibly encrypted audiovisual information.

A high speed telecommunications modem adapter 41 is included to create the link with an audiovisual information distribution network controlled by a host server.

For the reproduction of audio information in musical selections, the system comprises loudspeakers 54 into which the signal from an amplifier tuner 53 connected to the electronic circuit 5 containing two memory buffers 56, 57 is input, the amplifier tuner being of the digital signal processor (DSP) type of music synthesizer designed to support a large number of input sources while providing an output with decrypted and decompressed digital signals with a CD (compact disk) or 1-Hifi type quality.

Similarly, the display means control circuit also comprises two memory buffers 66, 67, the purpose of which is described later.

A 240 Watt Ventilated Power Supply with Temperature Regulation Supplies Energy to the System. This Power Supply is Protected Against Overcurrents and Overoscillations.

The audiovisual reproduction system manages a touchscreen 33 that includes a glass coating panel based on the "advanced surface wave technology" and an AT type bus controller, through its input controller circuit 3. This touchscreen displays various selection information for use by customers, and control and management checking information for use by the manager, on the video monitor 62 or television screen 61, and the system owner then uses it to make a selection. It is also used for maintenance purposes in combination with an external keyboard 34 that may be connected to the system and that is provided with a keyboard connector controlled by a key lock 32 through the interface circuit 3.

The input circuit 3 also forms the interface between the system and a remote control assembly 31, for example composed of a radio frequency RF remote control.

A fee payment device 35 is also connected to the input interface circuit 3. Another device may be used capable of collecting any means of payment by coins, notes, tokens, magnetic cards or smart cards or any combination of these means of payment.

The system is designed to be fitted in a frame or rack that is provided, together with customizable external finishings.

Apart from these elements, a cordless microphone 55 is connected to the sound controller 5 that can transform the jukebox into a powerful public announcement and information system, or possibly a karaoke machine. Similarly, a cordless loudspeakers system may be used by the system to broadcast songs into other rooms.

The manager can use the remote control assembly 31, for example from behind the bar, to access and control different controls such as:
the microphone on/off switch,
the loudspeaker mute control,
the sound volume control,
the control to cancel the musical selection currently being played.

Two buffers 56, 57 are associated with the sound controller circuit 5 so that each can alternately memorize information corresponding to about at least a quarter of a second of sound. Similarly, two buffers 66, 67 are associated with the video controller circuit 6, each capable of alternately memorizing about at least a tenth of a second of image. Finally, one buffer 46 is associated with the communication controller circuit 4, another 36 with the input interface 3 and another 26 with the memory interface 2.

The operating software in the system was generated around a library of tools and services specifically designed for the audiovisual field in a multimedia universe. This library advantageously includes a high performance multitask operating system that efficiently enables simultaneous execution of multiple code fragments. This operating software enables concurrent and orderly execution, thus avoiding any conflict between operations carried out on display means, audio reproduction means and management of telecommunication links through the distribution network. Furthermore, this software is extremely flexible.

The operating system is shared into modules comprising a first starter module 7 itself sub-divided into a first main program module 70 "JUK. EXE" that verifies the memory and verifies if the minimum number of objects necessary to enable operation of the jukebox is present; a second module 71 dynamically linked to it and dependent on it consists of the "JUKECORE. DLL" module. The function of this second module 71 is to contain C language libraries and to perform the main task.

The architecture of the operating system comprises a distribution of the different tasks into software modules connected to each other by dynamic links or composed of executable subprograms presenting main dependence links with other parts of the operating system. Each of the modules is composed of object files or dynamic link libraries organized according to a plurality of dependence levels described in the attributes. The attributes of an object or a library indicate the version number and dependences of the object file or the library with respect to other object files as described below for the PARSER. DJL module. Each attribute indicates the level assigned to the module. Thus, the JUK.EXE 70 module is at a higher level than the JUKECORE. DLL 71, TLS. DLL 72, CRDE. DLL 73, GFX. DLL 74, WDLL. DLL 75, JEEP. DLL 9 and TELECOM. DLL 10 modules, but the TELECOM. DLL 10 module depends on the JEEP. DLL module 9 (see link 910) and it is therefore at a lower level than JEEP. DLL 9.

Similarly, the level of JEEP. DLL 9 (see link 759) is lower than the level of the WDLL. DLL module 75 since it is dependent on it and TLS (link 725) is at a higher level than WDLL 75. On the other hand, TLS. DLL and GFX. DLL modules may be at the same level. The main task comprises a module (JUKECORE. DLL) designed to initialize or load the module 73, the program core "CRDE. DLL", initialize or load the graphic management module (GFX. DLL) 74, initialize or load the library loading module (WDLL. DLL) 75, load the telecommunication tasks Telecom module (DLL) 10, load the TLS. DLL module 72 that contains all usages necessary for the jukebox, for telecom, time, decryption, etc., initialize or load the library of JEEP. DLL (Juke Execution Exchange Protocol) programs performing integrity server and loading request tasks and the dialog with the, server, and starting the program module 80, SILOAD. DLL as the main task. The main jukebox application task comprises the module (SILOAD. DLL) containing the loader program library designed to verify the required dynamic links library versions in the library loading module (WDLL. DLL), to load them or call the telecommunication tasks module to perform the file transfer. The WDLL. DLL module comprises the list of the minimum versions necessary for operation in a DLL. DEFAULT file, and the list of all functions represented either by libraries with a DLL, DJL suffix, or by object files with a DJO suffix. Each object or library contains the list of all functions that the library or the object needs, and version numbers and dependences. The WDLL. DLL library loading module manages all new modules, controls inter-dependences and checks that downloaded modules do not have any other dependences and have been loaded with the necessary versions. The application part 8 specific to a jukebox comprises a number of modules loaded and run by the SILOAD. DLL module and defining the following display windows:

a mouse signal or touch-screen signal processing module 81, called MOUSE. DJL, a module 82 for the processing of messages exchanged between objects and various other modules, called WMESSAGE. DJL, a disk files management module 83, called FIL. DJL a disk files read-write module 84, called FILIO. DJL a module JSTRUCT. DJL 85 for supervision of all events generated by equipment such as the touch-screen, the sound card, the coin collection equipment processing interface.

The SILOADL. DLL module manages loading of modules specific to the terminal task, namely all previously enumerated DJL modules and jukebox library modules 87 built up using WOBJECT. DJL 870 that manages the objects such as the mixer, purchases; the WCURSOR. DJL module 871 that manages cursor movements; the DBMAPI. DJL module 872 that manages the database; the WFONTS. DJL module 873 that manages all font types; the PARSER. DJL module 874 (syntax analysis program) that analyzes and generates screens starting from the script that creates a configuration file WIN. DEF and verifies the grammar using the "GRAMMAR. DJL" module 876 and the "LEXY. DJL" module 875 that is the lexical word functions assignment module inside the language. The PARSER. DJL module 874 contains the following information in its file header:

char*parser_version_info=DLL_INFO DJL;"
DLL-NAME PARSER. DJL;"
"VERSION 1;"
"CREATOR KENDALF;"
"REQUIRIES lexyy. djl;4;"
"REQUIRIES grammar-. djl;5";

All modules and all libraries (DJO, DLL, DJL) contain information similar to the information in the PARSER. DJL module and this information determines version and dependence needs.

Figure 2:
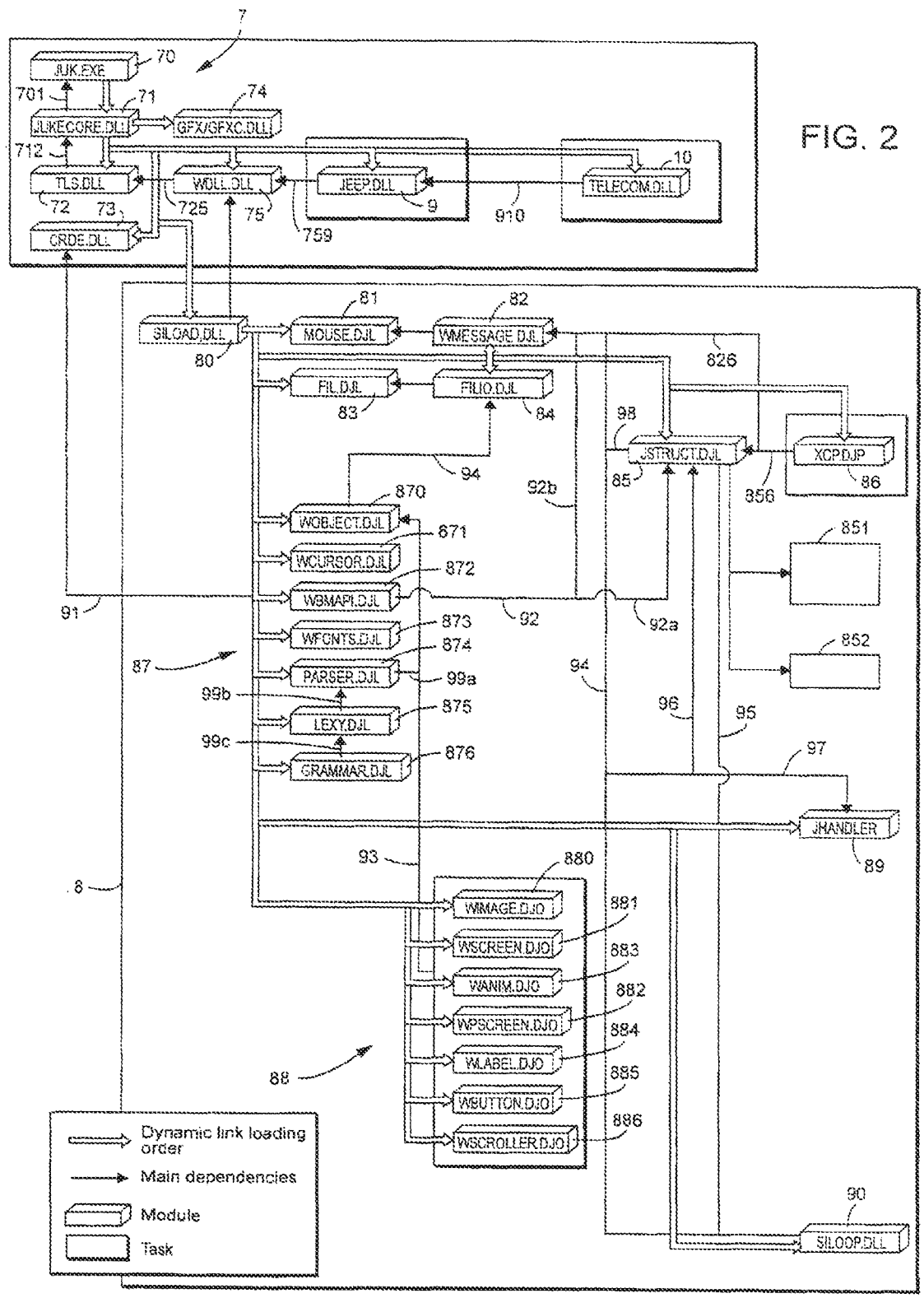
FIG. 2 represents a logic diagram showing relations between modules of libraries and object modules imported on the jukebox.

Thus, the PARSER. DJL module needs LEXY. DJL version 4 and GRAMMAR version 5 modules otherwise it cannot be executed by the system. The double arrows between the different modules in FIG. 2 show the order of loading the different files.

Thus, as seen above, the first step is to load JUKE. EXE followed by JUKECORE. DLL, so that GFX. DLL, TLS. DLL, WDLL. DLL, JEEP. DLL, TELECOM. DLL, CRDE. DLL and SILOAD. DLL can be loaded from JUKECORE. DLL.

A set of modules 88 contains the list of files that are to be included to manage the windows of a window display on the jukebox type terminal monitor.

This list of objects is composed of:

a "WPSCREEN. DJO" objects file 883 that defines the main page on the monitor, a "WSCREEN. DJO" objects file 881 that is used to determine the number of screens available and thus displays several windows or screens on this main page, a "WIMAGE. DJO" objects file 880 that determines and defines the image that it will use in the screen, a "WANIM. DJO" objects file 882 that defines the animation when the image is animated, a "WBUTTON.DJO" objects file 885 that defines and manages buttons that are used on the main page screen such as the control buttons used in a typical graphic interface, a "WLABEL. DJO" objects file 884 that creates labels used to write on an object; and a "WSCROLLER. DJO" objects file 886 that defines vertically scrolling display areas.

The WIN. DEF configuration file calls one or more of the *. DJO files mentioned above depending on needs.

A "JHANDLER" library is used to define fixed usages of screens and therefore to determine which interfaces provide the link with the different objects defined by the previous modules.

Library module "XCP. DJL" 86 is used to manage payment tasks such as bank note reception systems or coin or smart card payment devices, and also to save basic information in the IBUTTON which is an integrated circuit for the storage of secret codes for the jukebox manager, and that can be used for example to decrypt encrypted files or songs.

Figure 3:
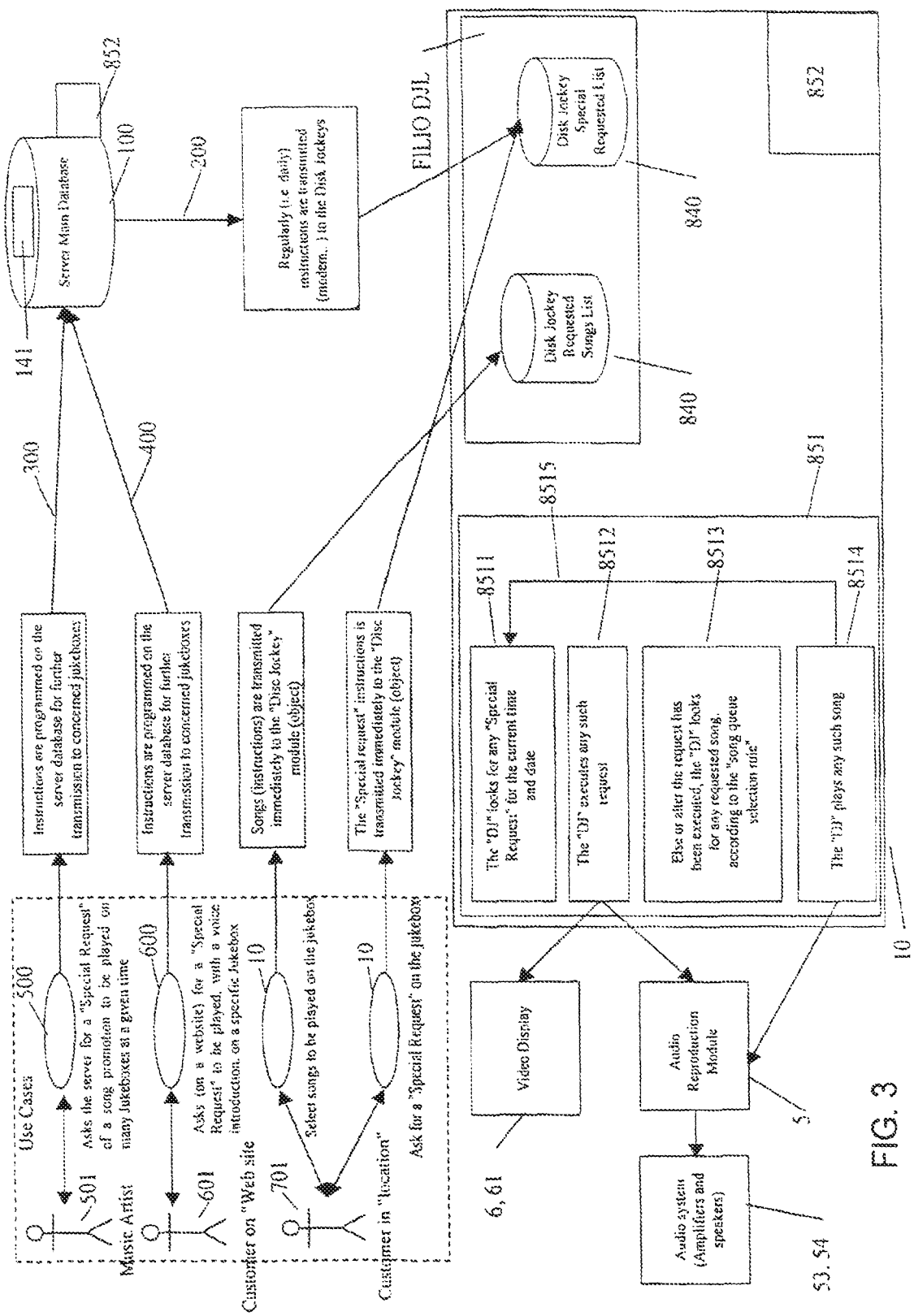
FIG. 3 diagrammatically represents the different interactions between a user, the jukebox and a server connected to the jukebox through a distribution network.
Figure 4:
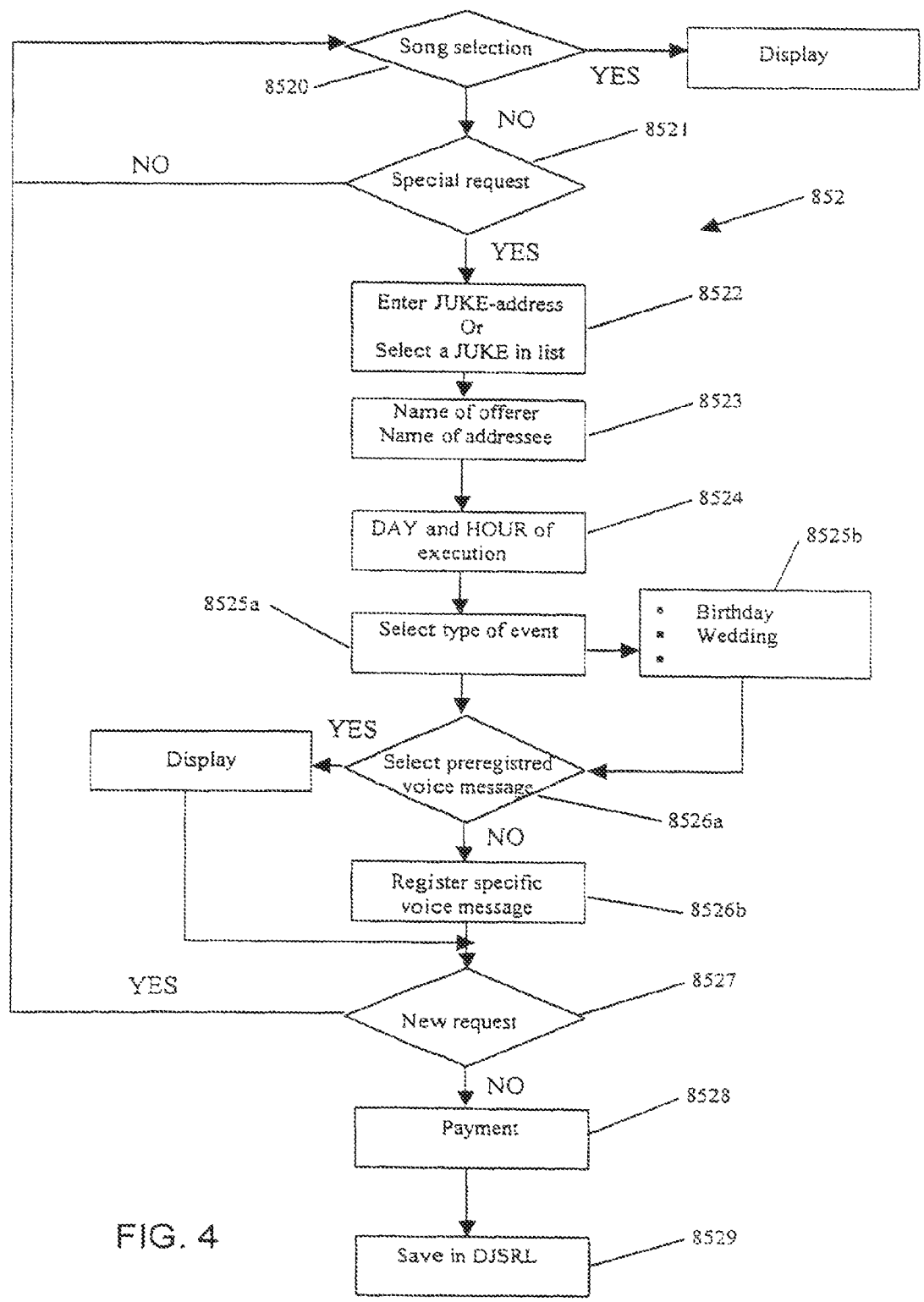
FIG. 4 represents the different steps of the process used by the devices according to the invention.

The JSTRUCT.DJL module 85 will run module 851 called the "disc-jockey" the function of which will be described below in relation to FIG. 3, when an event occurs corresponding to the end of song selection. Depending on the detected event, the same JSTRUCT.DJL module may start the request processing module 852, the function of which will be described below in relation with FIG. 4. This same request processing module 852 is also installed on the host server 100 (FIG. 3) to allow a user 601 connected to the server through a terminal 600 and the Internet network 400 to order a selection in advance. A music artist 501 can also use a terminal 500 connected to the server 100 through the Internet network 300 to make a special request for promotion of a song to be executed on several jukeboxes at a given time of a given day. Finally, a user 701 in a room equipped with one or several jukeboxes can make a selection of songs or special requests for advance orders of a selection or a special event, himself or on the jukebox 10. Song selection requests are loaded into the songs queue 840, and advance orders of a selection or a special event requests are loaded into a file 841 containing special requests and all information necessary to process these special requests. The server 100 will also include a file 141 storing these special requests until the time that the server makes a transmission to the specific jukebox or the set of specific jukeboxes to which one or several requests are applicable. This transmission is made through a network 200, for example a telecommunications network. The disc-jockey module 851 executes a first step 8511 in which it looks in the jukebox file 841 to find any special requests for the current time and the current date. If it finds any, the disc-jockey executes this request at step 8512 and starts reproduction of the selection ordered in advance and the individual message, if any. At the end of this operation, the disc-jockey checks, in step 8513, to see if there are any songs ordered in advance, or goes onto the next song stored in the queue in the file 840. In step 8514, the disc-jockey starts execution of this song. The disc-jockey then loops back 8515 to the first step 8511. The special requests processing program module 852 comprises means of producing a display as shown in FIG. 4 asking the user in front of the jukebox or a terminal connected to the Internet, in step 8521, if he would like to select a song in step 8520, or if he would like to make a special request. If he would like to make a special request, the program will use the object modules described above to display windows in which the user can define the jukebox address in step 8522, or select this address in a list downloaded by the server. The user will thus define either the jukebox for which he knows the address, or the jukebox that he selects in the list closest to the person to whom he wishes to offer the selection in his advance order. In the next step, 8523, the program displays screens that the user can use to enter the name of the person sending the song and the name of the person receiving it. In step 8524, the program displays windows in which the date and time at which the selection will be executed can be defined.

Once this definition has been made, the program goes on to step 8525*a* in which the user selects the event type that he wishes to celebrate. In this case, the program will display a list of events 8525*b* defining events such as birthdays, marriage, engagements, etc. The user moves the cursor to one of these events either by action on the touch-screen or by using a keyboard or a mouse, and validates this selection. Once the selection has been validated, the program goes on to the next step 8526*a* in which it displays a message asking the user if he would like to offer this selection with a prerecorded voice message. If so, the program displays windows that guide the user in selecting a prerecorded voice message. If not, the program goes on to the next step 8526*b* in which the user can make a special voice recording and store the recording with the data making up the file for this special request for an advance order. In step 8527, the program displays a screen asking the user if he would like to make a new request, and if so it loops back to the first step 8520, and if not it asks the user to make a payment in step 8528. This payment may be made by magnetic credit card or smart card in a known manner or any other means such as a coin machine, bank note machine or by displaying the number of telephone communication units that will be invoiced to the user's line, and acceptance of the invoice. Once this payment has been made and verified, the program goes on to the save step in the file 841 containing the list of special requests to the disc-jockey (DJSRL). This file 841 is located either in the jukebox if the selection and special request are made locally on the same jukebox installed in the bar, or in the file 141 on the server if the selection is to be made on another jukebox. The jukebox 10 also comprises a program that can detect special requests made to another jukebox installed in another location and can write this request into the file 141 on the server by transmission through the network 200 to the server 100, such that when the server executes its periodic loading routine to the various jukeboxes, it also downloads the specific requests concerning each jukebox. In order to do this, when the server receives this type of special request from a jukebox on the network, it will examine this request by comparing the address of the jukebox contained in the request with the addresses contained in its database and thus determine the identity of the jukebox to which it must address the special request. This special request will be routed to the destination jukebox when periodic updates are being made or during periodic communications.

Obviously, for communications between the jukebox and the server or an Internet terminal and the server, information is compressed and encoded to enable confidentiality, whereas voice messages may be recorded in plain text not necessarily requiring encoding, but will be compressed for storage purposes to reduce the necessary storage area on the jukebox.

Thus, according to the invention, the selection process comprises a step in which a menu 8520, 8521 is displayed and a selection is made in it to make special requests, and other functions;

a step displaying the event 8525*a* for which the advance order of a selection is made, followed by selection of the event;

a step 8522 displaying the identity of a destination equipment on which the selection is to be played, followed by selection of this equipment;

a step 8523 displaying the date and time at which the selection is to be made on the destination equipment;

a step 8529 for recording or downloading to a special requests file only after payment has been confirmed.

According to another characteristic of the invention, it includes a step 8526 for selecting or recording a special message.

According to another characteristic, the invention comprises a step 8526*b* for recording messages consisting of recording a personal message.

According to another characteristic, the invention comprises a step 8526*a* in which a message is selected consisting of choosing one among several messages.

According to another characteristic, the invention comprises a step in which all jukeboxes make a connection to Internet and call the server site 100.

According to another characteristic, the display steps are made by sending Internet messages to the terminal 600 in order to display the selection steps necessary for selection steps, these selection or determination steps being made by messages sent from the terminal 600 to the server 100 as a function of actions performed by the user on his terminal to define his selection in advance.

The invention comprises a step in which the messages and requests are recorded on a file 141 on the host server 100 with the address of the destination equipment 10 and are then downloaded onto it at a given moment on the displays done.

The invention comprises a step to examine a special file 841 on each equipment 10 containing the recorded requests, to determine if the current date and time on the equipment 10 correspond to the required date and time for execution of the advance request.

Similarly, the jukebox 10 or server 100 comprise means of displaying information on a screen close to the user to guide him in the choice of special requests;

means of recording these requests in a special file 841, 141;

means of periodically examining the file 841, 141 recorded on the equipment to trigger execution of the request at the given time and date, or to trigger downloading of this request.

The invention comprises means of remotely transmitting these requests to the destination equipment.

According to the invention, the display means are composed of object modules added in *. DJO files called according to needs by the jukebox configuration file.

The files 840, 841 will be saved in the FILO. DJL module and program modifications necessary for operation and embodiment of this process will be downloaded in the different modules, in accordance with the downloading process defined in patent application 98 09358.

The device also comprises a means of defining rules for execution of the songs queue and thus modifying the behavior of the disc-jockey according to one of the following criteria; first in first out (FIFO) in the queue, at random and selecting the most popular songs first, eliminating the second consecutive song by the same artist or based on a combination of the previous rules or any other rule.

The remote distribution network comprises firstly a host server connected to the Internet network, and secondly through a second network, to a set of jukeboxes each identifiable by an identity number or an address in order to load each special request on the destination jukebox and means of scanning the file containing the special requests on each jukebox to have them executed when the local time and the day correspond to the selected time and day.

It will be obvious to persons familiar with the subject that many different embodiments would be possible within the framework of this invention as claimed. Consequently, the embodiments described herein must be considered as illustrations and can be modified within the field defined by the attached claims, and the invention cannot be restricted to the details described above.

What is claimed is:

1. A user terminal operable to cause music to be ordered for playback on destination equipment, the user terminal comprising:
   a network interface configured to enable the user terminal to connect to a host server; and
   processing resources including a hardware processor and memory coupled to the hardware processor, the processing resources being configured to control the user terminal to at least:
      display, via the user terminal, a listing of musical items that are playable on the destination equipment;
      receive a user selection of a musical item to be played back on the destination equipment, the user selection being performable in connection with the listing;
      enable receipt of user input specifying a time at which the selected musical item is to be played;
      transmit, from the user terminal to the server, information identifying the destination equipment, the selected musical item, and scheduling information for playing the selected musical item; and
      causing the selected musical item to be played back via the destination equipment in relation to a time determined according to the scheduling information for the selected musical item is to be played;
   wherein the destination equipment is different than the user terminal.

2. The terminal of claim 1, wherein the information identifying the destination equipment, the selected musical item, and the scheduling information for playing the selected musical item is saved to a file on the server, and the file is subsequently transmitted from the server to the destination equipment.

3. The terminal of claim 1, wherein the processing resources are further configured to control the user terminal to at least receive an indication of an event for which the user selection is being made.

4. The terminal of claim 1, wherein the processing resources are further configured to control the user terminal to at least enable a message to be associated with the user selection to be chosen or saved.

5. The terminal of claim 4, wherein the processing resources are further configured to control the user terminal to at least transmit the message to the server.

6. The terminal of claim 4, wherein the message is selectable from a plurality of predefined messages.

7. The terminal of claim 1, wherein transmission of the information identifying the destination equipment, the selected musical item, and the time at which the selected musical item is to be played from the terminal also triggers electronic transfer of the information the destination equipment.

8. The terminal of claim 1, wherein the processing resources are further configured to control the user terminal to at least verify receipt of payment to authorize generation and transmission of the information identifying the destination equipment, the selected musical item, and said scheduling information for playing the selected musical item.

9. An electronic device, comprising:
   a network interface facilitating a connection to a host server via a network;
   a display device;
   processing resources including a hardware processor and memory coupled to the hardware processor, the processing resources being configured to control the electronic device to at least:
      display, via the display device, a user interface configured to enable a user to order, in advance, a selection to be played on at least one destination device connectable via the network to the host server and located remote from the electronic device,
      the user interface being further configured to enable the user to specify a selection to be played, and a time at which the selection is to be played;
      receive, via the user interface, at least one request concerning a selection to be played, scheduling information for playing the selected musical item, and a selection of at least one destination device;
      display, in connection with the user interface, an indication of each said destination device on which the selection is to be played, the selection to be played, the time the selection is to be played;
      generate, responsive to verification that the selection has been made, a listing of each said received request;
      electronically transfer to the server the generated listing; and
      causing, in connection with the electronic transfer, any selections in the listing to be played back in relation to the times at which the respective selections are to be played and in relation to the selected destination device(s).

10. The electronic device of claim 9, wherein a request processing module is provided to each destination device, the request processing module being configured to receive and process a relevant portion of the listing generated at the electronic device.

11. The electronic device of claim 9, wherein the user interface is programmed to enable the user to specify a message for later display.

12. The electronic device of claim 11, wherein the message is included in the listing.

13. The electronic device of claim 11, wherein the user interface is programmed to enable the user to specify a message for later display, select a predefined message, and/or specify a custom message.

14. The electronic device of claim 11, wherein the message is displayable on a specified destination device.

15. The electronic device of claim 14, wherein the specified destination device is programmed to determine whether a current time matches the time specified in the listing for selections in the listing that are to be played back thereon.

16. The electronic device of claim 15, wherein the specified destination device is further programmed to cause a given selection to be played in the event that there is a match between the current time and the time specified in the listing for the given selection.

17. The electronic device of claim 9, wherein the listing is separate from selections to be played.

18. The electronic device of claim 9, the user interface is further configured to enable the user to specify an event associated with a selection to be played.

19. The electronic device of claim 18, wherein the event occurs in the future.

* * * * *